(12) United States Patent
Lee

(10) Patent No.: US 10,879,599 B2
(45) Date of Patent: Dec. 29, 2020

(54) VEHICLE, CONTROL METHOD THEREOF AND ANTENNA APPARATUS FOR VEHICLE

(71) Applicants: HYUNDAI MOTOR COMPANY, Seoul (KR); KIA MOTORS CORPORATION, Seoul (KR)

(72) Inventor: Sang Heun Lee, Seoul (KR)

(73) Assignees: Hyundai Motor Company, Seoul (KR); KIA Motors Corporation, Seoul (KR)

(*) Notice: Subject to any disclaimer, the term of this patent is extended or adjusted under 35 U.S.C. 154(b) by 61 days.

(21) Appl. No.: 16/206,632

(22) Filed: Nov. 30, 2018

(65) Prior Publication Data

US 2020/0091593 A1 Mar. 19, 2020

(30) Foreign Application Priority Data

Sep. 19, 2018 (KR) .......................... 10-2018-0112063

(51) Int. Cl.
*H01Q 1/32* (2006.01)
*H01Q 5/307* (2015.01)
*H01Q 1/50* (2006.01)

(52) U.S. Cl.
CPC ............. *H01Q 1/3275* (2013.01); *H01Q 1/50* (2013.01); *H01Q 5/307* (2015.01)

(58) Field of Classification Search
CPC combination set(s) only.
See application file for complete search history.

(56) References Cited

U.S. PATENT DOCUMENTS

| | | | |
|---|---|---|---|
| 5,857,145 A | 1/1999 | Miyashita | |
| 6,317,027 B1 * | 11/2001 | Watkins | G06K 7/0008 |
| | | | 340/10.1 |
| 2006/0111056 A1 | 5/2006 | Dutta | |
| 2007/0042734 A1 | 2/2007 | Ryu et al. | |
| 2007/0224948 A1 | 9/2007 | Hartenstein et al. | |
| 2012/0295554 A1 | 11/2012 | Greene et al. | |
| 2017/0186415 A1 | 6/2017 | An et al. | |
| 2018/0261913 A1 * | 9/2018 | Imamura | H01Q 9/40 |

FOREIGN PATENT DOCUMENTS

KR 10-2011-0051023 5/2011

OTHER PUBLICATIONS

European Search Report dated Jun. 28, 2019 from the corresponding European Application No. 18210996.7, 8 pages.

* cited by examiner

*Primary Examiner* — Junpeng Chen
(74) *Attorney, Agent, or Firm* — Brinks Gilson & Lione

(57) ABSTRACT

A vehicle, control method of the vehicle, and antenna for vehicle is provided. The vehicle includes an antenna having different gain characteristics in different operating frequency bands; and a controller configured to correct reception strengths of a plurality of signals having different frequencies for carrying identical content, change the gain characteristic of the antenna based on the corrected reception strengths of the signals, and obtain content from a signal having a maximum corrected reception strength among the signals having different frequencies.

12 Claims, 19 Drawing Sheets

FIG. 14

| | 87 | 87.5 | 88 | 88.5 | 89 | 89.5 (f1) | 90 | 90.5 | 91 | 91.5 | 92 |
|---|---|---|---|---|---|---|---|---|---|---|---|
| SW1 | -0.5 | -0.32 | -0.18 | -0.08 | -0.02 | 0 | -0.02 | -0.08 | -0.18 | -0.32 | -0.5 |
| SW2 | -5.12 | -4.5 | -3.92 | -3.38 | -2.88 | -2.42 | -2 | -1.62 | -1.28 | -0.98 | -0.72 |
| SW3 | -14.58 | -13.52 | -12.5 | -11.52 | -10.58 | -9.68 | -8.82 | -8 | -7.22 | -6.48 | -5.78 |
| SW4 | -28.88 | -27.38 | -25.92 | -24.5 | -23.12 | -21.78 | -20.48 | -19.22 | -18 | -16.82 | -15.68 |
| | 92.5 | 93 | 93.5 | 94 | 94.5 | 95 (f2) | 95.5 | 96 | 96.5 | 97 | 97.5 |
| SW1 | -0.72 | -0.98 | -1.28 | -1.62 | -2 | -2.42 | -2.88 | -3.38 | -3.92 | -4.5 | -5.12 |
| SW2 | -0.5 | -0.32 | -0.18 | -0.08 | -0.02 | 0 | -0.02 | -0.08 | -0.18 | -0.32 | -0.5 |
| SW3 | -5.12 | -4.5 | -3.92 | -3.38 | -2.88 | -2.42 | -2 | -1.62 | -1.28 | -0.98 | -0.72 |
| SW4 | -14.58 | -13.52 | -12.5 | -11.52 | -10.58 | -9.68 | -8.82 | -8 | -7.22 | -6.48 | -5.78 |
| | 98 | 98.5 | 99 | 99.5 | 100 | 100.5 (f3) | 101 | 101.5 | 102 | 102.5 | 103 |
| SW1 | -5.78 | -6.48 | -7.22 | -8 | -8.82 | -9.68 | -10.58 | -11.52 | -12.5 | -13.52 | -14.58 |
| SW2 | -0.72 | -0.98 | -1.28 | -1.62 | -2 | -2.42 | -2.88 | -3.38 | -3.92 | -4.5 | -5.12 |
| SW3 | -0.5 | -0.32 | -0.18 | -0.08 | -0.02 | 0 | -0.02 | -0.08 | -0.18 | -0.32 | -0.5 |
| SW4 | -5.12 | -4.5 | -3.92 | -3.38 | -2.88 | -2.42 | -2 | -1.62 | -1.28 | -0.98 | -0.72 |
| | 103.5 | 104 | 104.5 | 105 | 105.5 | 106 (f4) | 106.5 | 107 | 107.5 | 108 | 108.5 |
| SW1 | -15.68 | -16.82 | -18 | -19.22 | -20.48 | -21.78 | -23.12 | -24.5 | -25.92 | -27.38 | -28.88 |
| SW2 | -5.78 | -6.48 | -7.22 | -8 | -8.82 | -9.68 | -10.58 | -11.52 | -12.5 | -13.52 | -14.58 |
| SW3 | -0.72 | -0.98 | -1.28 | -1.62 | -2 | -2.42 | -2.88 | -3.38 | -3.92 | -4.5 | -5.12 |
| SW4 | -0.5 | -0.32 | -0.18 | -0.08 | -0.02 | 0 | -0.02 | -0.08 | -0.18 | -0.32 | -0.5 |

VEHICLE, CONTROL METHOD THEREOF AND ANTENNA APPARATUS FOR VEHICLE

CROSS-REFERENCE TO RELATED APPLICATION

The present application claims priority to and the benefit of Korean Patent Application No. 10-2018-0112063, filed on Sep. 19, 2018, which is incorporated herein by reference in its entirety.

TECHNICAL FIELD

Forms of the present disclosure relate to a vehicle, a control method thereof, and a receiver for a vehicle, and more particularly, to a vehicle, a control method thereof, and an antenna apparatus for a vehicle, which are capable of changing a reception frequency of a signal.

BACKGROUND

The statements in this section merely provide background information related to the present disclosure and may not constitute prior art.

In general, a vehicle refers to a moving device or a transport device which travels on a road or a track by using fossil fuel, electricity, or the like as a power source.

The vehicle serves as a living space to provide relaxation to a driver beyond merely being the moving device or the transport device. In addition, various electronic devices for vehicles are installed in the vehicle to provide comfort and relaxation to the driver.

Further, the vehicle is provided with an antenna configured to receive radio waves to receive radio broadcasts or the like. The antenna for the vehicle has a high resonance frequency gain, but a gain of the antenna decreases as a frequency deviates from the resonance frequency. Conventionally, in order to compensate for such performance problems, the antenna is provided with an amplifier configured to amplify strengths of signals in both side frequency bands with respect to the resonance frequency.

However, when the amplifier is provided, a strength of noise as well as the strengths of signals in both side frequency bands is amplified, so that a signal-to-noise ratio has difficulty in improvement.

In addition, in order to optimize power efficiency, impedance matching for the antenna has been considered. However, since it is difficult for a conventional amplifier to implement the impedance matching for a high impedance of the antenna, a power is wasted in general.

SUMMARY

Therefore, it is an aspect of the present disclosure to provide a vehicle, a control method thereof, and an antenna apparatus for a vehicle, which have high signal-to-noise ratio characteristics regardless of a frequency band.

It is another aspect of the present disclosure to provide a vehicle, a control method thereof, and an antenna apparatus for a vehicle, which are capable of implementing optimum impedance matching for an antenna according to a frequency.

It is still another aspect of the present disclosure to provide a vehicle, a control method thereof, and an antenna apparatus for a vehicle, which are capable of automatically changing a frequency according to an area.

Additional aspects of the disclosure will be set forth in part in the description which follows and, in part, will be obvious from the description, or may be learned by practice of the disclosure.

In accordance with one aspect of the present disclosure, a vehicle includes: an antenna having different gain characteristics in different operating frequency bands; and a controller configured to correct reception strengths of a plurality of signals having different frequencies for carrying identical content, change the gain characteristic of the antenna based on the corrected reception strengths of the signals, and obtain content from a signal having a maximum corrected reception strength among the signals having different frequencies.

The controller may correct the reception strengths of the signals by using a plurality of characteristic functions indicating the different gain characteristics.

The controller may include a first characteristic function of a first operating frequency band and a second characteristic function of a second operating frequency band, and obtain the content from a signal having a first frequency based on whether an output value of the first characteristic function for the first frequency is greater than an output value of the second characteristic function for a second frequency.

The controller may correct the reception strengths of the signals by using a plurality of characteristic tables indicating the different gain characteristics.

The controller may include a first characteristic table of a first operating frequency band and a second characteristic table of a second operating frequency band, and obtain the content from a signal having a first frequency based on whether an output value of the first characteristic table for the first frequency is greater than an output value of the second characteristic table for a second frequency.

The antenna may include a coil configured to receive a wireless signal and a switch configured to adjust an operating frequency band of the coil, and the controller may change the operating frequency band of the coil by controlling the switch based on the corrected reception strengths of the signals.

The switch may be connectable to the coil at a plurality of connection points, and the operating frequency band of the coil may be adjusted as the connection point of the switch is changed based on the corrected reception strengths of the signals.

The controller may determine the operating frequency band of the coil based on a frequency selected by a user.

The vehicle may further include an amplifying unit configured to amplify a wireless signal received from the antenna, and the controller may control an impedance fluctuation range of the amplifying unit based on the corrected reception strengths of the signals.

The amplifying unit may include a switch, a plurality of inductors, and an amplifying circuit, and the controller may connect the switch to one of the inductors based on the corrected reception strengths of the signals.

In accordance with another aspect of the present disclosure, a method of controlling a vehicle including an antenna having different gain characteristics in different operating frequency bands includes: correcting reception strengths of a plurality of signals having different frequencies for carrying identical content; changing the gain characteristic of the antenna based on the corrected reception strengths of the signals; and obtaining content from a signal having a maximum corrected reception strength among the signals having different frequencies.

The correcting of the reception strengths of the signals may include correcting the reception strengths of the signals by using a plurality of characteristic functions indicating the different gain characteristics.

The obtaining of the content from the signal having the maximum corrected reception strength may include obtaining the content from a signal having a first frequency based on whether an output value of a first characteristic function for the first frequency is greater than an output value of a second characteristic function for a second frequency.

The correcting of the reception strengths of the signals may include correcting the reception strengths of the signals by using a plurality of characteristic tables indicating the different gain characteristics.

The obtaining of the content from the signal having the maximum corrected reception strength may include obtaining the content from a signal having a first frequency based on whether an output value of a first characteristic table for the first frequency is greater than an output value of a second characteristic table for a second frequency.

In accordance with still another aspect of the present disclosure, an antenna apparatus includes: a coil configured to receive a wireless signal; a switch configured to adjust an operating frequency band of the coil; and a controller configured to correct reception strengths of a plurality of signals having different frequencies for carrying identical content, change the operating frequency band of the coil by controlling the switch based on the corrected reception strengths of the signals, and obtain content from a signal having a maximum corrected reception strength among the signals having different frequencies.

The controller may correct the reception strengths of the signals by using a plurality of characteristic functions indicating gain characteristics of the operating frequency band.

The controller may include a first characteristic function of a first operating frequency band and a second characteristic function of a second operating frequency band, and obtain the content from a signal having a first frequency based on whether an output value of the first characteristic function for the first frequency is greater than an output value of the second characteristic function for a second frequency.

The controller may correct the reception strengths of the signals by using a plurality of characteristic tables indicating gain characteristics of the operating frequency band.

The controller may include a first characteristic table of a first operating frequency band and a second characteristic table of a second operating frequency band, and obtain the content from a signal having a first frequency based on whether an output value of the first characteristic table for the first frequency is greater than an output value of the second characteristic table for a second frequency.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 11:
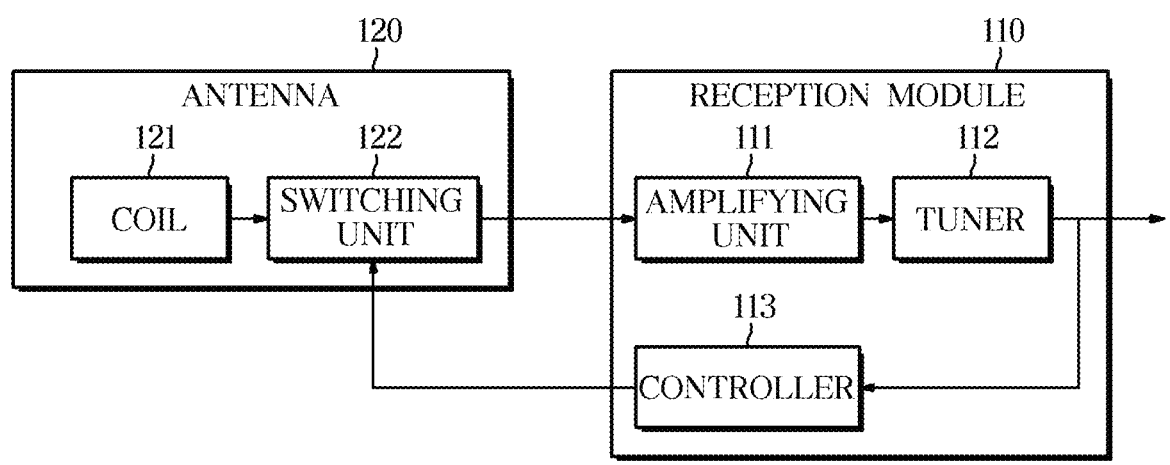
Figure 12:
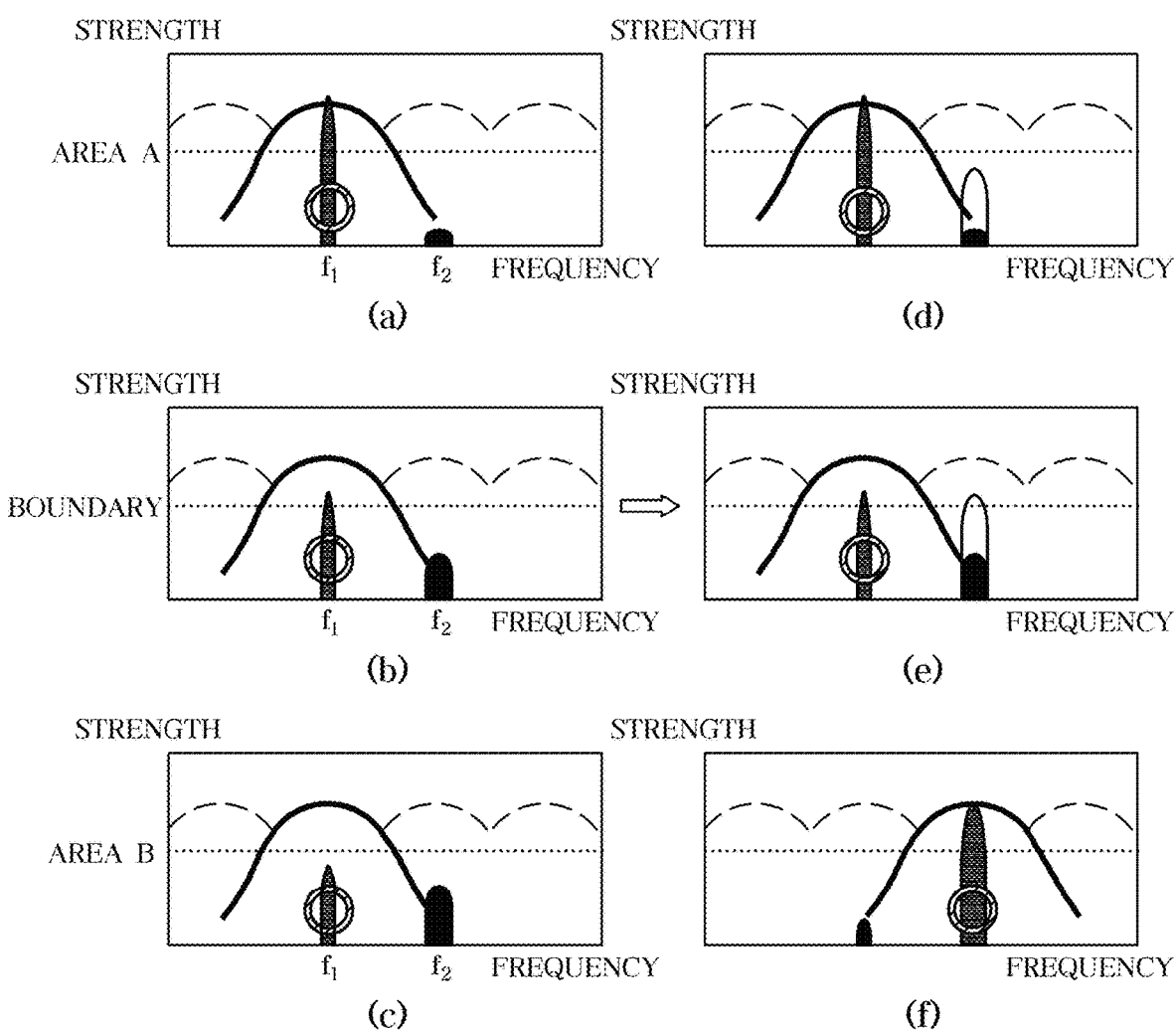
Figure 13:
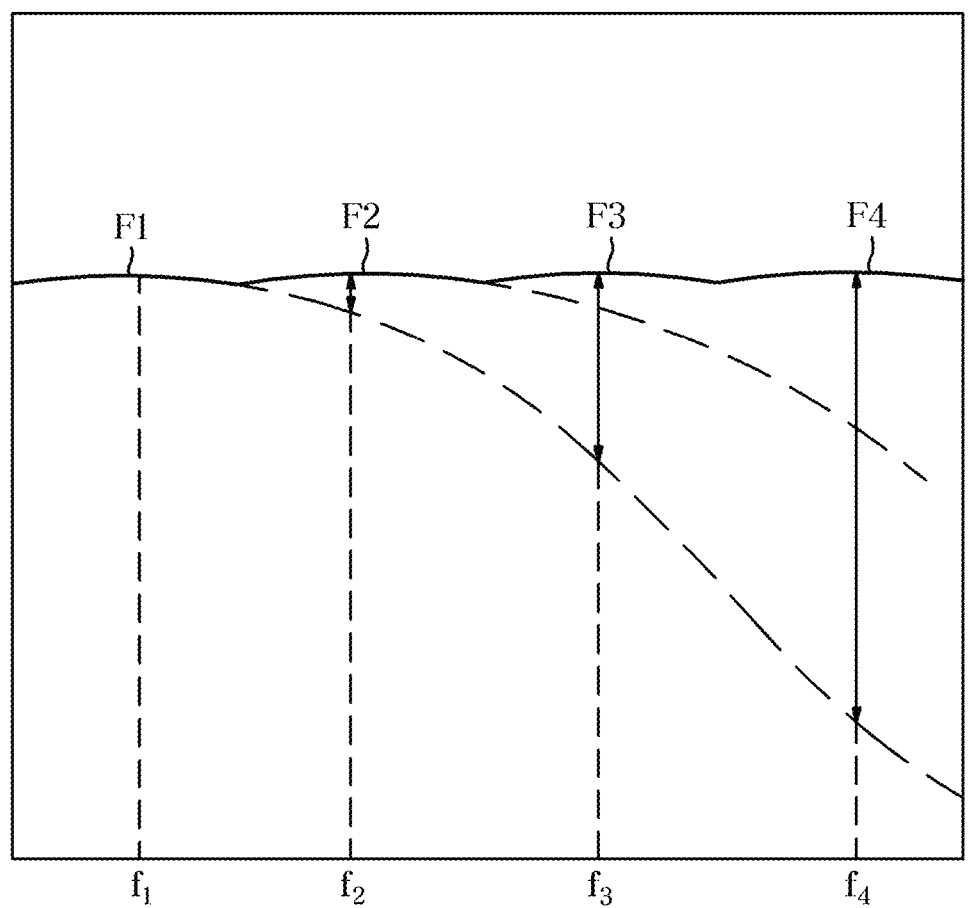
Figure 15:
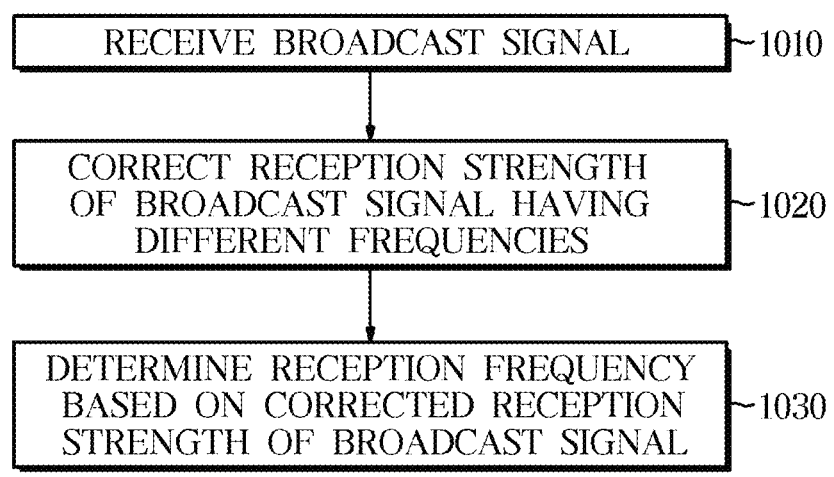

FIGS. 10A, 10B, 10C, 10D, and 10E are views illustrating a complex plane Smith chart for an impedance of the antenna apparatus in another form of the present disclosure;

FIG. 11 is a view illustrating a configuration of an antenna apparatus in another form of the present disclosure;

FIG. 12 is a view illustrating a frequency gain to explain an operation of the antenna apparatus in another form of the present disclosure;

FIGS. 13 and 14 are views illustrating gain correction values of the antenna apparatus in another form of the present disclosure; and FIG. 15 is a view illustrating the operation of the antenna apparatus in another form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application or uses. It should be understood that throughout the drawings, corresponding reference numerals indicate like or corresponding parts and features.

Figure 1:
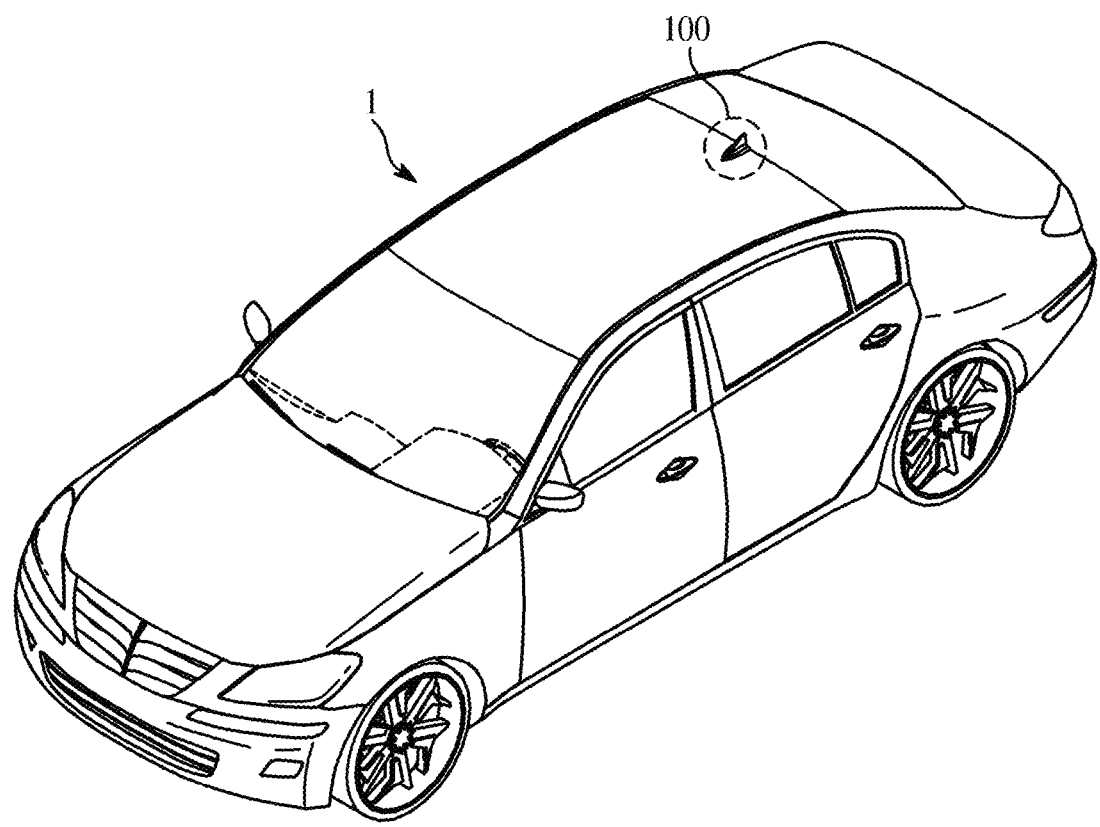
FIG. 1 is a view illustrating a vehicle in one form of the present disclosure.
Figure 2:
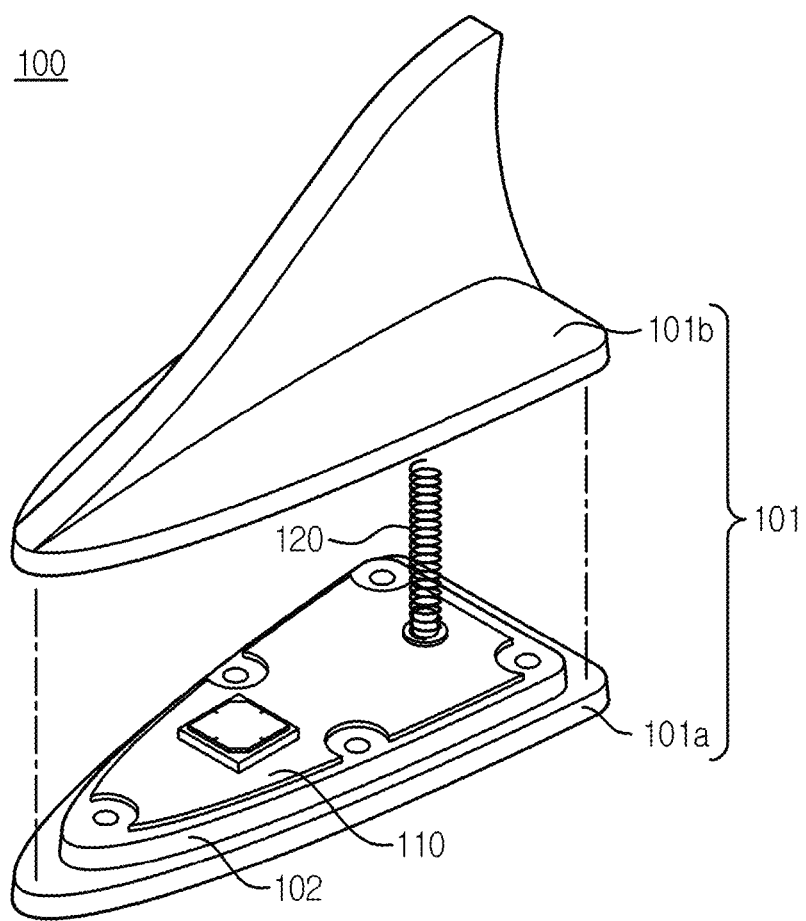
FIG. 2 is a view illustrating a structure of an antenna apparatus in one form of the present disclosure.

FIG. 1 is a view illustrating a vehicle in one form of the present disclosure. FIG. 2 is a view illustrating a structure of an antenna apparatus in one form of the present disclosure.

Referring to FIGS. 1 and 2, a vehicle 1 includes a body configured to form an exterior of the vehicle 1 and accommodate a driver and/or a luggage, a chassis including components of the vehicle 1 other than the body, and electrical components configured to protect the driver or provide convenience to the driver. The body may form an interior space accommodated for the driver, an engine room configured to accommodate an engine, and a trunk room configured to accommodate a cargo. The chassis may include devices configured to generate a power to allow the vehicle 1 to travel according to control of the driver, and drive/brake/steer the vehicle 1 by using the power. The electrical components may control the vehicle 1, and provide safety and convenience for the driver and a passenger.

A roof panel of the vehicle 1 is provided with an antenna apparatus 100 configured to receive wireless signals such as a radio signal, a broadcast signal, and a satellite signal, and transmit and receive signals to and from other vehicles, servers, and base stations.

The antenna apparatus 100 includes a housing 101 including a bottom member 101a mounted on the roof panel of the vehicle 1 and a cover member 101b coupled to the bottom member 101a to cover internal components.

The bottom member 101a is formed of a material including a synthetic resin, and attached to the body to prevent foreign substances from entering between the body and the cover member 101b and mitigate an impact transmitted from the body.

The bottom member 101a is provided at an upper rear portion of the vehicle to obtain less apprehension about interference with peripheral components and achieve a high reception rate of the wireless signal.

In addition, the bottom member 101a has a sectional shape gradually widened toward a rear to reduce wind resistance and noise generated when the body moves.

The housing 101 may be provided in a shark fin type.

The antenna apparatus 100 includes a base member 102 disposed on the bottom member 101a, and a reception module 110 disposed on the base member 102.

The base member 102 may be coupled to the bottom member 101a in a bonding or bolting scheme, and may be coupled to the reception module 110 in a bolting scheme.

The base member 102 provides a space for mounting the reception module 110 and antennas 120.

The reception module 110 may be provided as a printed circuit board (PCB) having wiring formed by etching copper or the like on a substrate.

The reception module 110 may include a hole through which a wire passes.

The reception module 110 may include a signal processing circuit configured to perform signal processing by amplifying or filtering a signal received by the antenna 120.

The reception module 110 transmits a signal to an electronic control unit (ECU) or a terminal mounted inside the body.

The reception module 110 extracts and optimizes a signal of a predetermined frequency band, for example, a broadcast signal such as a frequency modulation (FM) signal, a amplitude modulation (AM) signal, a digital audio broadcasting (DAB) signal, or a digital multimedia broadcasting signal.

The reception module 110 may be implemented as a single integrated reception module by mounting components, such as a band pass filter (BPF), a switch, a tuner, a buffer, and a digital signal processor (DSP), on a circuit board.

One or more antennas 120 may be provided and may be seated in the reception module 110.

The antenna 120 refers to an antenna configured to receive a signal in one frequency band as a signal in a fundamental frequency band. The one frequency band may be, for example, a frequency band of various broadcast signals, such as an FM band, an AM band, a DAB band, or a DMB band.

The antenna 120 is mounted on the reception module 110 to transmit the received signal to the reception module 110.

A coil antenna may be used as the antenna 120, and various other antennas such as a chip antenna and a microstrip patch antenna may be used as the antenna 120.

Figure 3:
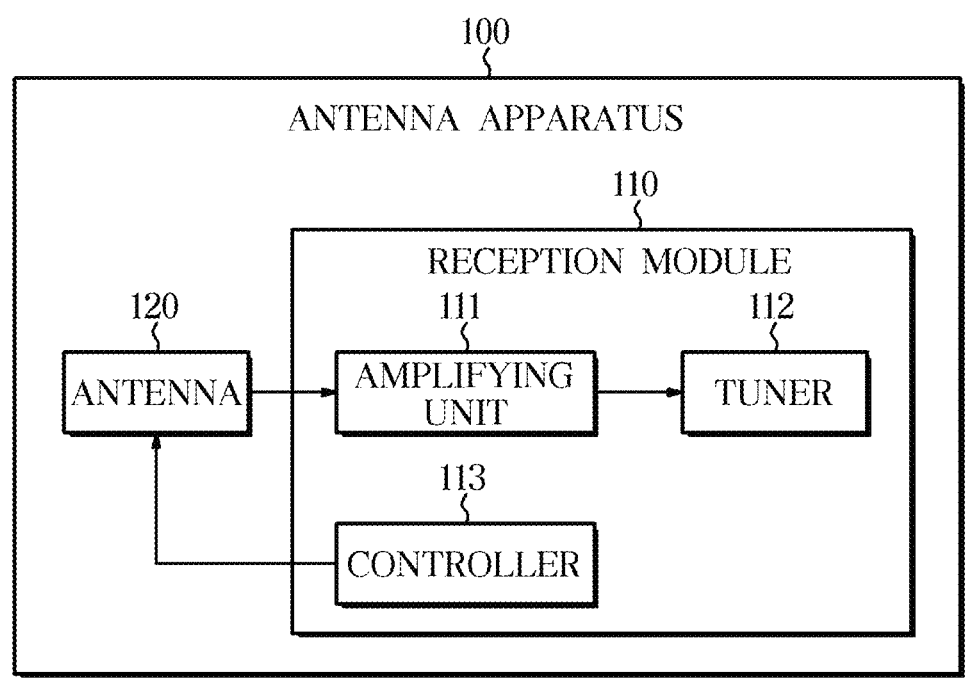
FIG. 3 is a view illustrating a configuration of the antenna apparatus in one form of the present disclosure.

FIG. 3 is a view illustrating a configuration of the antenna apparatus in one form of the present disclosure.

The antenna apparatus 100 includes a reception module 110 and an antenna 120.

The reception module 110 may include an amplifying unit 111, a tuner 112, and a controller 113. Although not shown, the reception module 110 may further include a filter configured to extract only a signal of a predetermined frequency band among signals received from the antenna 120.

The amplifying unit 111 is a component for amplifying the signal received from the antenna 120, and may include an amplifier configured to amplify the signal of the predetermined frequency band.

The tuner 112 tunes to a frequency selected by a user to extract a signal of the selected frequency.

The tuner 112 may provide the signal of the frequency selected by the user to an audio system of the vehicle 1 as an acoustic signal. The tuner 112 may tune to the selected frequency through the audio system of the vehicle 1.

The signal extracted from the tuner 112 may be transmitted to the audio system of the vehicle 1, and the audio system may transmit the transmitted signal as a sound.

The controller 113 controls a frequency band that is receivable by the antenna 120 or controls an impedance fluctuation range of the amplifying unit 111.

The controller 113 may control the frequency band that is receivable by the antenna 120 (hereinafter referred to as "operating frequency band") by adjusting an operation range of a coil included in the antenna 120. When the coil becomes longer, the operating frequency band of the antenna 120 becomes lower.

The controller 113 may change the impedance fluctuation range of the amplifying unit 111 by changing an element value of the amplifying unit 111. In this case, the controller 113 may select the element value of the amplifying unit 111 such that impedance matching can be performed with respect to the antenna 120.

The controller 113 may adjust the operation range of the coil included in the antenna 120, and change the element value of the amplifying unit 111 as described above.

A control process of the controller 113 of the antenna apparatus 100 will be described in detail below.

The controller 113 may generate various control signals for controlling components in the antenna apparatus 100.

The controller 113 may be implemented as a module separate from the reception module 110, or as a module integrated with the electronic control unit (ECU) of the vehicle 1.

The controller 113 may be implemented as a memory (not shown) configured to store an algorithm for controlling operations of the components in the antenna apparatus 100, or data of a program for reproducing the algorithm, and a processor (not shown) configured to perform operations described above by using the data stored in the memory. In this case, the memory and the processor may be implemented as separate chips. Alternatively, the memory and the processor may be implemented as a single chip.

The controller 113 may transmit a signal to an electronic control unit (ECU), a terminal, or the like. In this case, a controller area network (CAN) communication scheme may be used to transmit the signal.

Figure 4:
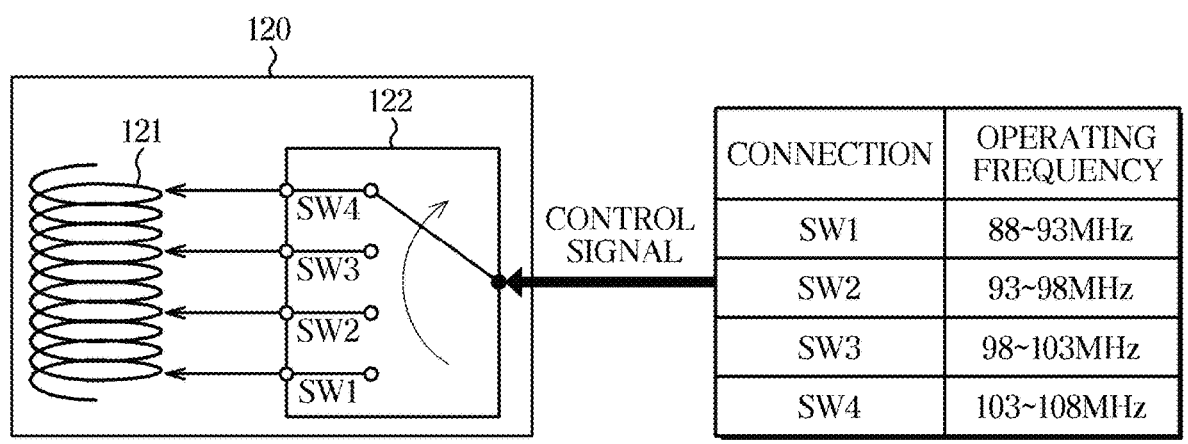
FIG. 4 is a view illustrating a detailed configuration of the antenna apparatus and an operating frequency according to an available range of a coil in one form of the present disclosure.
Figure 5:
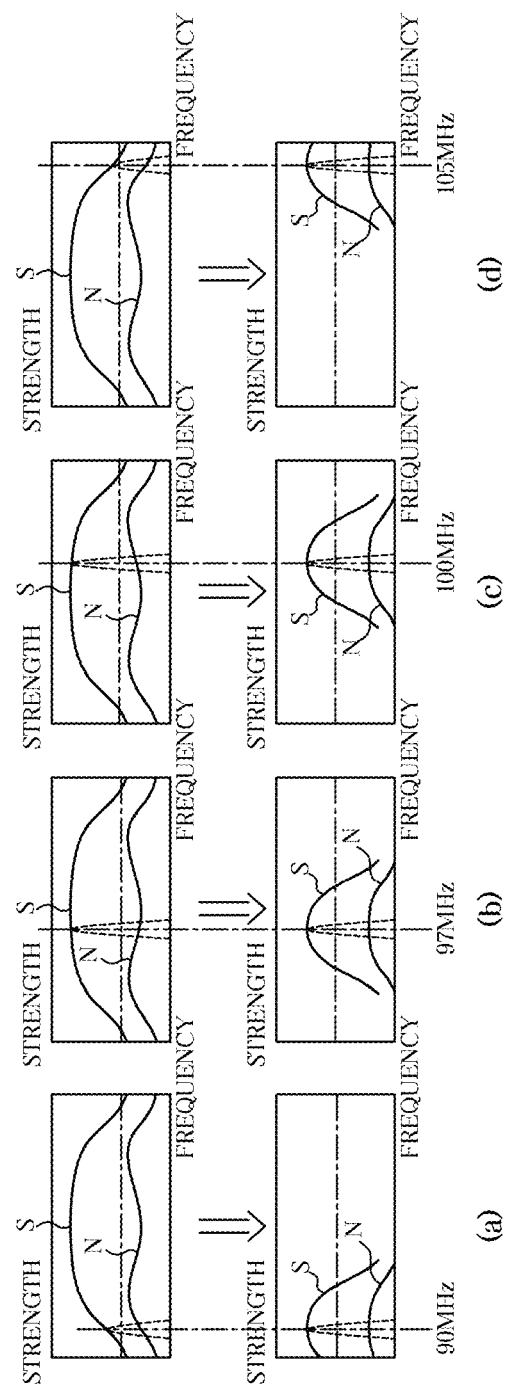
FIGS. 5 and 6 are views illustrating a frequency to a signal strength when using the antenna apparatus in one form of the present disclosure.
Figure 6:
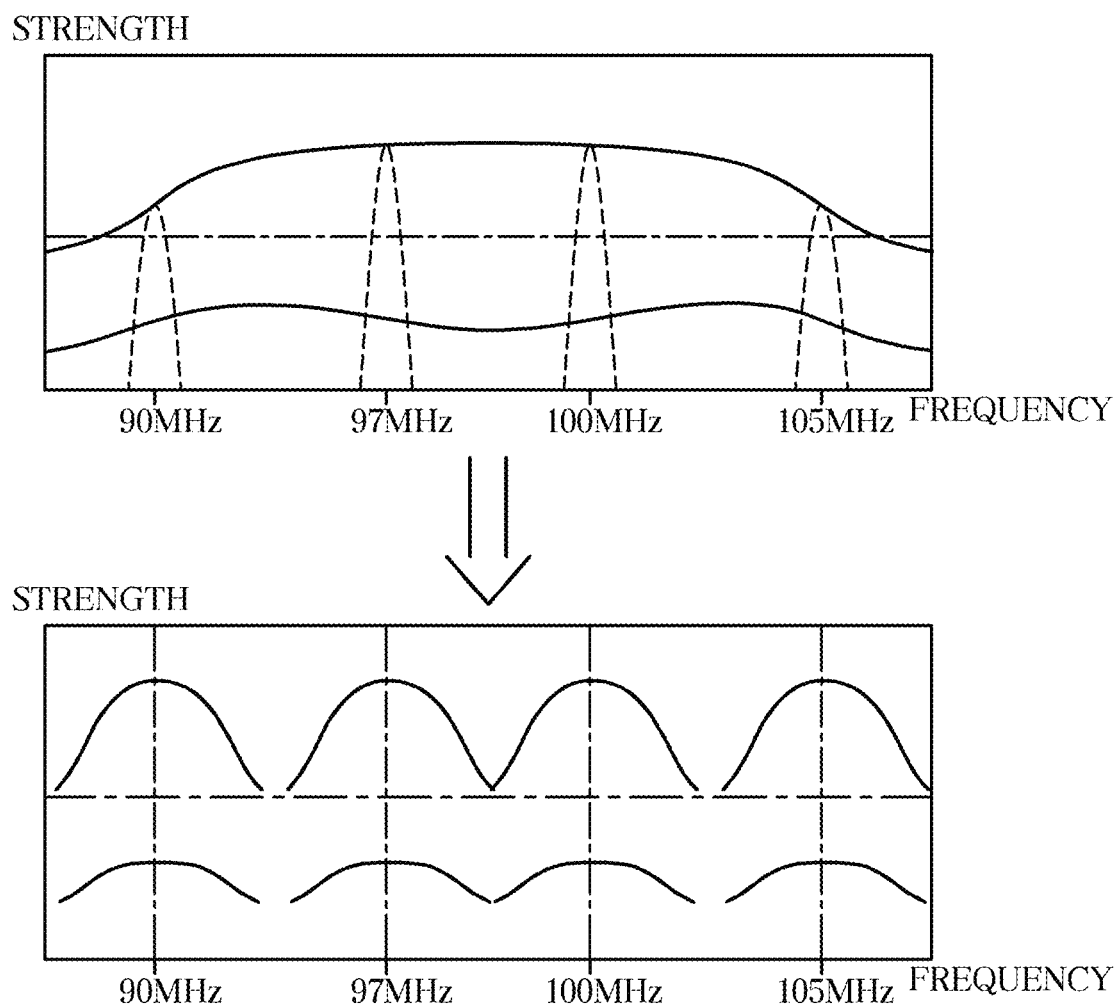
Figure 7:
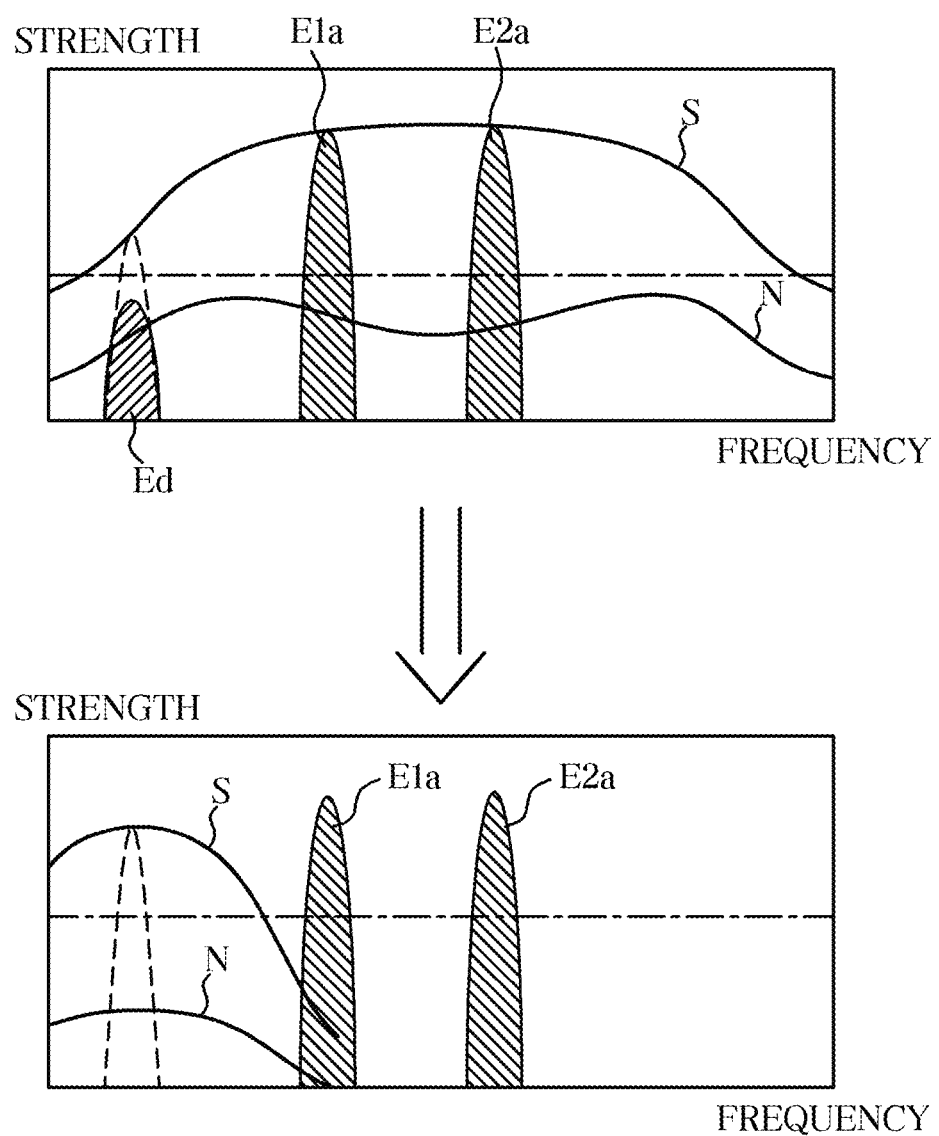
FIG. 7 is a view illustrating an effect obtained in a strong electric field when using the antenna apparatus in one form of the present disclosure.

FIG. 4 is a view illustrating a detailed configuration of the antenna apparatus and an operating frequency according to an available range of a coil in one form of the present disclosure. FIGS. 5 and 6 are views illustrating a frequency to a signal strength when using the antenna apparatus in one form of the present disclosure. FIG. 7 is a view illustrating an effect obtained in a strong electric field when using the antenna apparatus in one form of the present disclosure.

Referring to FIG. 4, the antenna 120 in one form of the present disclosure may include a coil 121 and a switching unit 122.

The coil 121 is operated by a current received through the switching unit 122. When a length of the coil 121 to be operated becomes longer, that is, the length of the coil 121 through which the current flows becomes longer, the frequency band that is receivable by the antenna 120 becomes lower.

The switching unit 122 may include a switch, and adjust the length of the coil 121 to be operated (that is, the operating range of the coil 121) by changing a connection point between the switching unit 122 and the coil 121 according to the control signal of the controller 113. In addition, as the operating range of the coil 121 is changed, the operating frequency band may be changed.

For example, as shown in FIG. 4, the operating frequency band may be in the range of 88 MHz or higher and lower than 93 MHz when the controller 113 places the switch of the switching unit 122 at a point SW1, the operating frequency band may be in the range of 93 MHz or higher and lower than 98 MHz as the operating range of the coil 121 is reduced when the controller 113 places the switch at a point SW2, the operating frequency band may be in the range of 98 MHz or higher and lower than 103 MHz as the operating range of the coil 121 is further reduced when the controller 113 places the switch at a point SW3, and the operating frequency band may be in the range of 103 MHz or higher and lower than 108 MHz as the operating range of the coil 121 is reduced even further when the controller 113 places the switch at a point SW4.

Referring to FIG. 5, the controller 113 may improve a ratio of a signal S to noise N ratio in comparison with a conventional antenna apparatus (upper graphs) by flexibly adjusting the operating frequency of the antenna 120 as described above.

In detail, when the switch is located at the point SW1 as shown in FIG. 4, the operating frequency band may be a certain frequency band of 88 MHz or higher and lower than 93 MHz as shown in FIG. 5A, and a higher ratio of the signal S to the noise N than a ratio of a signal S to noise N of the conventional antenna apparatus 100 can be obtained at the frequency of 90 MHz selected by the user.

In addition, when the switch is located at the point SW2, the operating frequency band may be a certain frequency band of 93 MHz or higher and lower than 98 MHz as shown in FIG. 5B, and a higher ratio of the signal S to the noise N than a ratio of the signal S to the noise N of the conventional antenna apparatus 100 can be obtained at the frequency of 97 MHz selected by the user.

In addition, when the switch is located at the point SW3, the operating frequency band may be a certain frequency band of 98 MHz or higher and lower than 103 MHz as shown in FIG. 5C, and a higher ratio of the signal S to the noise N than a ratio of the signal S to the noise N of the conventional antenna apparatus 100 can be obtained at the frequency of 100 MHz selected by the user.

In addition, when the switch is located at the point SW4, the operating frequency band may be a certain frequency band of 103 MHz or higher and lower than 108 MHz as shown in FIG. 5D, and a higher ratio of the signal S to the noise N than a ratio of the signal S to the noise N of the conventional antenna apparatus 100 can be obtained at the frequency of 105 MHz selected by the user.

When the antenna 120 is operated by dividing the operating frequency band as described above, as shown in FIG. 6, a higher ratio of the signal S to the noise N than a ratio of a signal S to noise N of a conventional configuration can be obtained at the frequency of 90 MHz, 97 MHz, 100 MHz, or 105 MHz selected by the user.

In some forms of the present disclosure, the frequency band is described as being divided into four operating frequency bands by the controller 113 and the switching unit 122, but a number of operating frequency bands is not limited thereto.

In addition, referring to FIG. 7, under a strong electric field condition, an intermodulation signal Eb due to strong electric field signals E1a and E2a may be generated, and signal interference may be increased by the intermodulation signal Eb. However, since the antenna 120 is operated only in some frequency bands, the intermodulation signal Eb can be reduced, so that reception performance can be improved.

Figure 8:
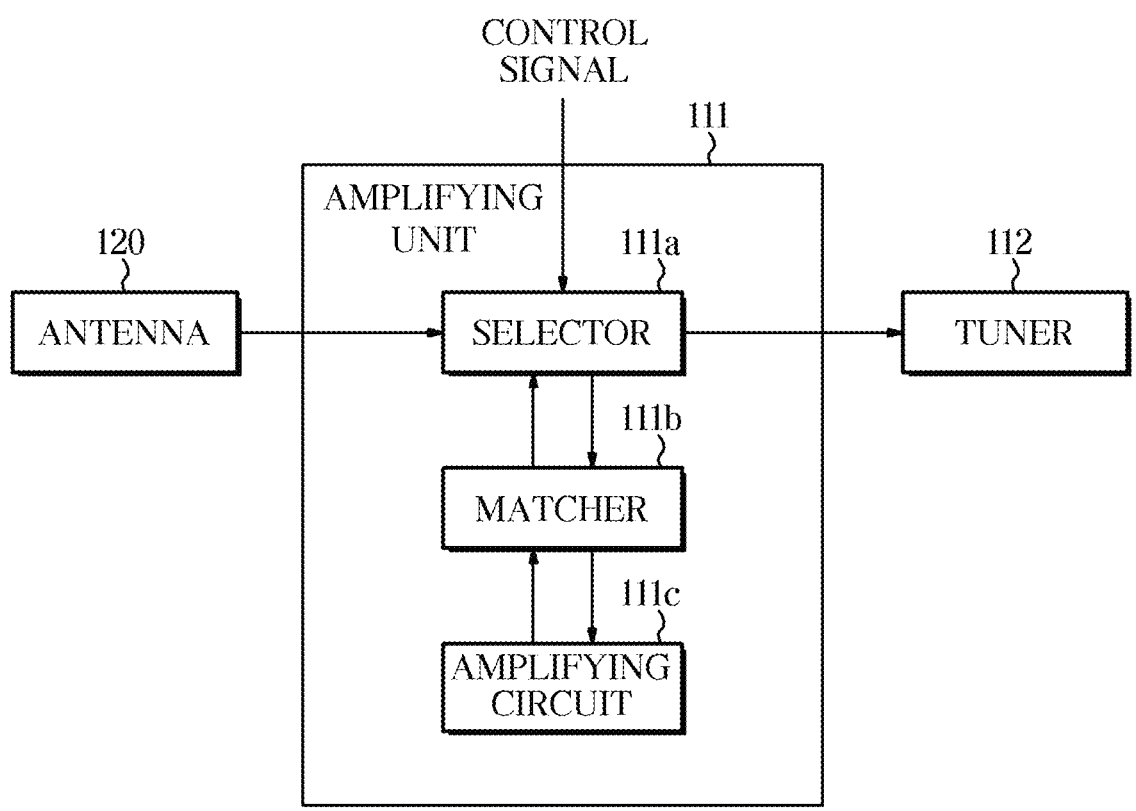
FIG. 8 is a view illustrating a configuration of an antenna apparatus in another form of the present disclosure.
Figure 9:
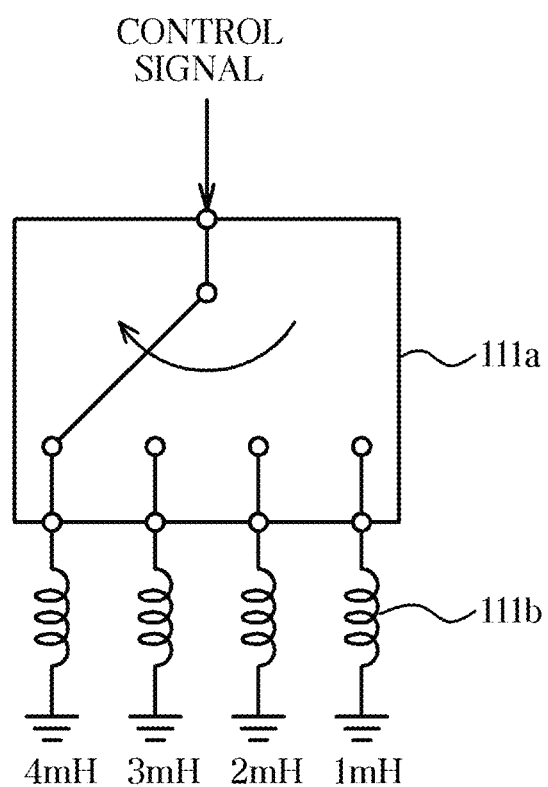
FIG. 9 is a view illustrating a detailed circuit of an amplifying unit of the antenna apparatus in another form of the present disclosure.

FIG. 8 is a view illustrating a configuration of an antenna apparatus in another form of the present disclosure. FIG. 9 is a view illustrating a detailed circuit of an amplifying unit of the antenna apparatus in another form of the present disclosure. FIGS. 10A, 10B, 10C, 10D, and 10E are views illustrating a complex plane Smith chart for an impedance of the antenna apparatus in another form of the present disclosure.

The antenna apparatus 100 may perform impedance matching with respect to the antenna 120 by adjusting the impedance fluctuation range of the amplifying unit 111.

The amplifying unit 111 of the antenna apparatus 100 includes a selector 111a and a matcher 111b to adjust the impedance fluctuation range of an internal amplifying circuit 111c.

The selector 111a may include a switch, and may control the impedance fluctuation range of the amplifying circuit 111c by selecting a connection point between the selector 111a and the matcher 111b according to the control signal of the controller 113.

The matcher 111b may include a plurality of inductors having different capacitances and connected in parallel with the amplifying circuit 111c, and adjust the impedance fluctuation range of the amplifying circuit 111c by selecting one of the inductors by the selector 111a.

The amplifying circuit 111c may be a typical circuit configured to amplify a signal strength, which is a well-known technique, so the detailed description thereof will be omitted.

Referring to FIG. 9, the controller 113 may control the selector 111a such that the amplifying circuit 111c is connected to one of the inductors of the matcher 111b, so that one inductor can be selected to control the impedance fluctuation range of the amplifying circuit 111c.

In this case, the controller 113 may change the impedance fluctuation range of the amplifying circuit 111c based on the frequency selected by the user.

In detail, referring to FIG. 10A, when an impedance AI of the antenna 120 is R+jX at a frequency of 500 kHz or higher and lower than 1700 kHz, which is an entire frequency band in which the antenna 120 is operable, an ideal impedance of the amplifying unit 111 for performing the impedance matching (hereinafter referred to as "impedance matching area OP") is a conjugate complex value R−jX.

Figure 10A:
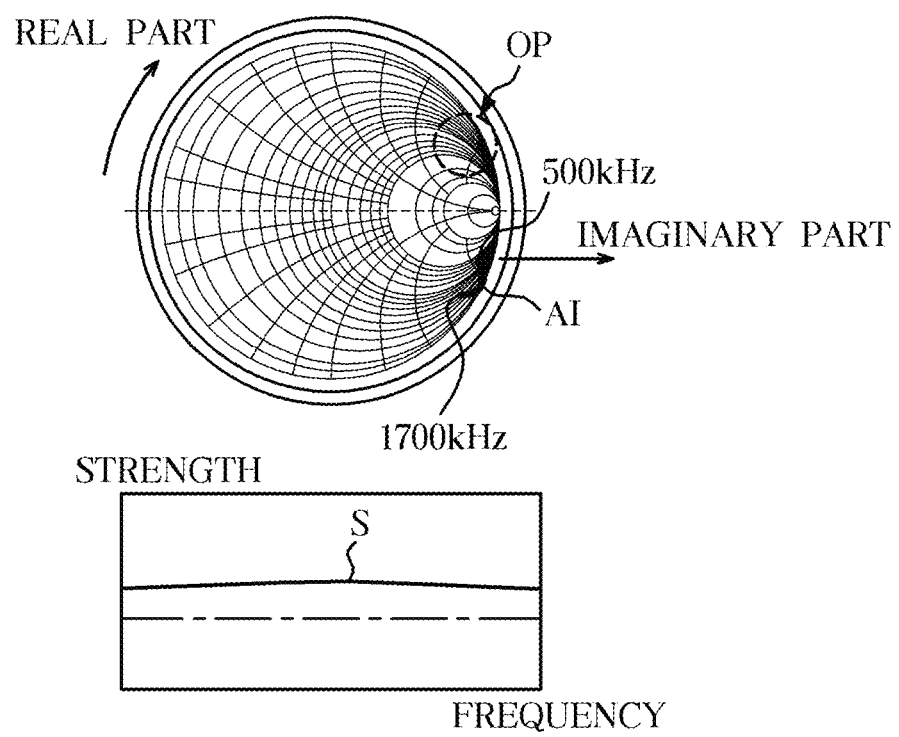

When a capacitance of the selected inductor (i.e., inductance) becomes smaller, the impedance fluctuation range of the amplifying unit 111 at the frequency of 500 kHz or higher and lower than 1700 kHz is shifted away from the impedance AI of the antenna 120 on an upper trace of FIG. 10A. In addition, the frequency band corresponding to the impedance matching area OP is increased (in FIG. 10A, the frequency band corresponding to the impedance matching area OP is increased to 500 kHz to 800 kHz when selecting an inductor of 4 mH, 800 kHz to 1100 kHz when selecting an inductor of 3 mH, and 1100 kHz to 1400 kHz when selecting an inductor of 2 mH).

Therefore, the controller 113 of the antenna apparatus 100 may adjust the impedance fluctuation range of the amplifying unit 111 such that the frequency selected by the user is present in the impedance matching area OP. In other words, the controller 113 may adjust the impedance fluctuation range of the amplifying unit 111 such that a region corresponding to the frequency selected by the user within the impedance fluctuation range of the amplifying unit 111 becomes the impedance matching area OP.

Figure 10B:
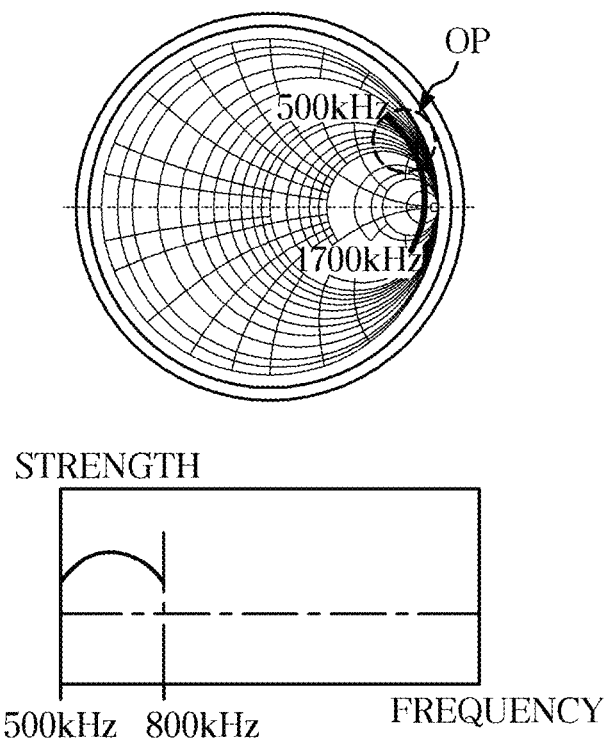

For example, when the frequency selected by the user is determined to be in the range of 500 kHz or higher and lower than 800 kHz, the controller 113 may change the impedance fluctuation range of the amplifying unit 111 at the frequency of 500 kHz or higher and lower than 1700 kHz (i.e., the entire frequency band that is receivable by the antenna 120) as shown in an upper portion of FIG. 10B, so that an impedance of the amplifying unit 111 can be present in the impedance matching area OP at a frequency of 500 kHz or higher and lower than 800 kHz.

Figure 10C:
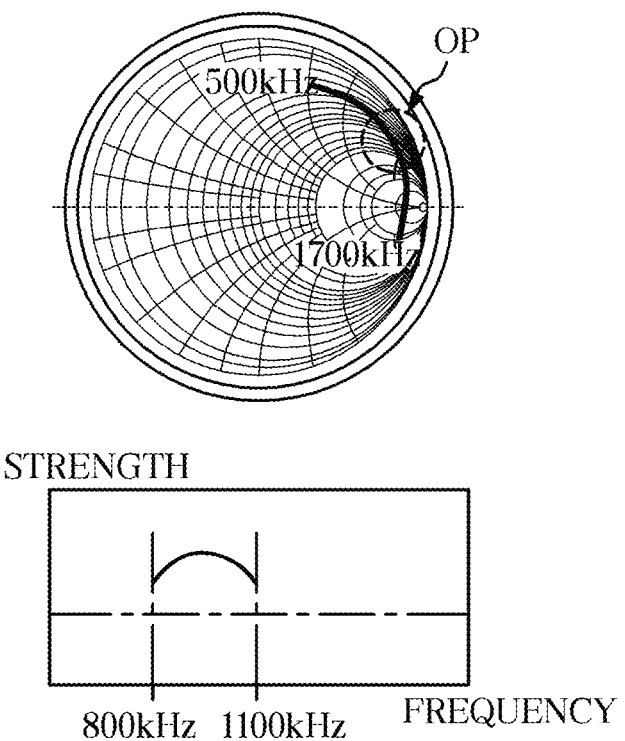

In addition, when the frequency selected by the user is determined to be in the range of 800 kHz or higher and lower than 1100 kHz, the controller 113 may change the impedance fluctuation range of the amplifying unit 111 at the frequency of 500 kHz or higher and lower than 1700 kHz as shown in an upper portion of FIG. 10C, so that the impedance of the amplifying unit 111 can be present in the impedance matching area OP at a frequency of 800 kHz or higher and lower than 1100 kHz.

Figure 10D:
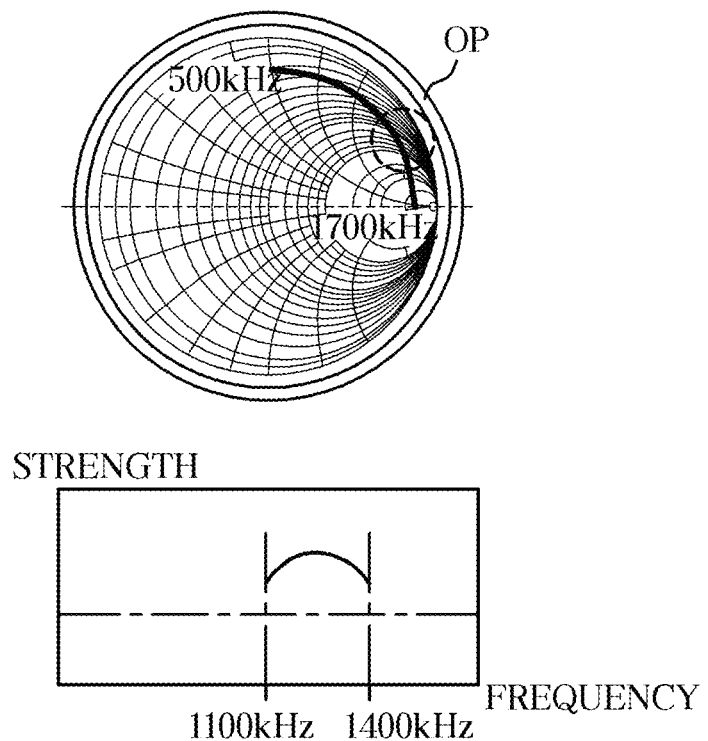

In addition, when the frequency selected by the user is determined to be in the range of 1100 kHz or higher and lower than 1400 kHz, the controller 113 may change the impedance fluctuation range of the amplifying unit 111 at the frequency of 500 kHz or higher and lower than 1700 kHz as shown in an upper portion of FIG. 10D, so that the impedance of the amplifying unit 111 can be present in the impedance matching area OP at a frequency of 1100 kHz or higher and lower than 1400 kHz.

Figure 10E:
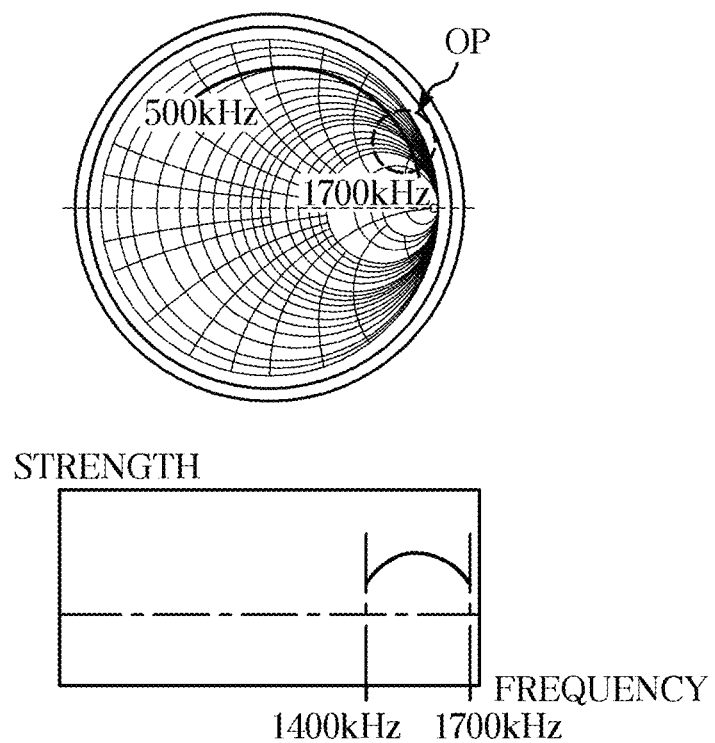

In addition, when the frequency selected by the user is determined to be in the range of 1400 kHz or higher and lower than 1700 kHz, the controller 113 may change the impedance fluctuation range of the amplifying unit 111 at the frequency of 500 kHz or higher and lower than 1700 kHz as shown in an upper portion of FIG. 10E, so that the impedance of the amplifying unit 111 can be present in the impedance matching area OP at a frequency of 1400 kHz or higher and lower than 1700 kHz.

In some forms of the present disclosure, a case where the entire frequency band that is receivable by the antenna 120 is in the range of 500 kHz or higher and lower than 1700 kHz is described for illustrative purposes, but the entire frequency band that is receivable by the antenna 120 is not limited thereto.

In addition, in some forms of the present disclosure, a case where the frequency selected by the user is divided into the frequency band of 500 kHz or higher and lower than 800 kHz, the frequency band of 800 kHz or higher and lower than 1100 kHz, the frequency band of and 1100 kHz or higher and lower than 1400 kHz by the controller 113 is described for illustrative purposes, but the controller 113 may divide the frequency selected by the user into various sections other than the above sections.

The antenna apparatus 100 includes the antenna 120 including the coil 121 and the switching unit 122 of the antenna apparatus 100 in one form of the present disclosure, and may include the amplifying unit 111 including the selector 111a, the matcher 111b, and the amplifying circuit 111c. The amplifying unit 111, the tuner 112, the controller 113, and the antenna 120 are described above, so the detailed description thereof will be omitted.

FIG. 11 is a view illustrating a configuration of an antenna apparatus in another form of the present disclosure. FIG. 12 is a view illustrating a frequency gain to explain an operation of the antenna apparatus in another form of the present disclosure. FIGS. 13 and 14 are views illustrating gain correction values of the antenna apparatus in another form of the present disclosure.

Referring to FIG. 11, an antenna apparatus 100 includes a reception module 110 and an antenna 120.

The antenna 120 may include a coil 121 and a switching unit 122, and the reception module 110 may include an amplifying unit 111, a tuner 112, and a controller 113.

Operations of the coil 121, the switching unit 122, the amplifying unit 111, and the tuner 112 may be identical to the operations of the coil, the switching unit, the amplifying unit, and the tuner shown in FIGS. 3 and 4.

The controller 113 controls the frequency band that is receivable by the antenna 120, or controls the impedance fluctuation range of the amplifying unit 111.

The controller 113 may control the frequency band that is receivable by the antenna 120 (hereinafter referred to as "operating frequency band") by adjusting an operation range of a coil included in the antenna 120, and change the impedance fluctuation range of the amplifying unit 111 by changing an element value of the amplifying unit 111.

The controller 113 may detect a change in an area (or the administrative area) where the vehicle 1 is located, or detect a change in a frequency of a broadcast signal currently being listened to.

The controller 113 may adjust the operation range of the coil in response to the change of the area (or the administrative area) or the frequency change of the broadcast signal. Accordingly, the controller 113 may control the frequency band that is receivable by the antenna 120 (hereinafter referred to as "operating frequency band").

In addition, the controller 113 may change the element value of the amplifying unit 111 in response to the change of the area (or the administrative area) or the frequency change of the broadcast signal. Accordingly, the controller 113 may change the impedance fluctuation range of the amplifying unit 111.

For example, content of a radio broadcast or digital media may be carried by a signal having a first frequency $f_1$ in an area A, and the content of the radio broadcast or the digital media may be carried by a signal having a second frequency $f_2$ in an area B.

The antenna apparatus 100 may receive the signal having the first frequency $f_1$ while the vehicle 1 is traveling in the area A. In this case, the signal may be a radio broadcast signal, a digital media signal, or the like, and the first frequency $f_1$ may indicate a frequency at which the content of the radio broadcast or the digital media is carried in the area A.

As shown in FIG. 12A, the first frequency $f_1$ may be in an operating frequency band of 93 MHz or higher and lower than 98 MHz, and may be included in an operating range of the antenna apparatus 100 when the switch is located at the point SW2. The second frequency $f_2$ may be in an operating frequency band of 98 MHz or higher and lower than 103 MHz, and may be included in the operating range of the antenna apparatus 100 when the switch is located at the point SW3. The signal having the first frequency $f_1$ and the signal having the second frequency $f_2$ may transmit identical broadcast content.

A strength of the signal having the first frequency $f_1$ is greater than a strength of the signal having the second frequency $f_2$ while the vehicle 1 is traveling in the area A. Therefore, the controller 113 may place the switch at the point SW2 so that the antenna apparatus 100 can have a maximum gain for the signal having the first frequency $f_1$.

As a result, a reception strength of the signal having the first frequency $f_1$ is significantly greater than a reception strength of the signal having the second frequency $f_2$ while the vehicle 1 is traveling in the area A.

While the vehicle 1 is traveling on a boundary between the area A and the area B, the strength of the signal having the first frequency $f_1$ is decreased, whereas the strength of the signal having the second frequency $f_2$ increased. Accordingly, as shown in FIG. 12B, the reception strength of the signal which has the first frequency $f_1$ and is received by the antenna apparatus 100 may be decreased, and the reception strength of the signal having the second frequency $f_2$ may be increased.

The strength of the signal having the first frequency $f_1$ may become smaller than the strength of the signal having the second frequency $f_2$ while the vehicle 1 is traveling in the area B. However, since the switch is located at the point SW2, that is, the antenna apparatus 100 is optimized to receive signals at 93 MHz or higher and lower than 98 MHz, as shown in FIG. 12C, the reception strength of the signal which has the first frequency $f_1$ and is received by the antenna apparatus 100 may be similar to or greater than the reception strength of the signal having the second frequency $f_2$.

The controller 113 may simply compare the reception strength of the signal having the first frequency $f_1$ with the reception strength of the signal having the second frequency $f_2$, and the controller 113 may place the switch at the point SW2 according to a comparison result. As a result, a reception rate of the signal in the area B may be reduced in comparison with a reception rate of the signal in the area A.

In order to prevent the above case, the controller 113 may estimate the reception strength of the signal having the second frequency $f_2$, and change a frequency at which the broadcast signal is received based on the estimated reception strength of the signal.

As shown in FIG. 12D, the reception strength of the signal having the first frequency $f_1$ is significantly greater than the reception strength of the signal having the second frequency $f_2$ while the vehicle 1 is traveling in the area A.

While the vehicle 1 is traveling on the boundary between the area A and the area B, the reception strength of the signal which has the first frequency $f_1$ and is received by the antenna apparatus 100 may be decreased, whereas the reception strength of the signal having the second frequency $f_2$ may be increased.

The controller 113 may determine a frequency change with regard to a maximum gain of signals having respective frequencies. For example, the controller 113 may correct the reception strength of the signal having the first frequency $f_1$ of 93 MHz or higher and lower than 98 MHz into a reception strength when the switch is located at the point SW2, and correct the reception strength of the signal having the second frequency $f_2$ of 98 MHz or higher and lower than 103 MHz into a reception strength when the switch is located at the point SW2. The controller 113 may compare the corrected reception strength of the signal having the first frequency $f_1$ with the corrected reception strength of the signal having the second frequency $f_2$, and determine a frequency change according to a comparison result. As shown in FIG. 12E, the corrected reception strength of the signal having the first frequency $f_1$ may still be greater than the corrected reception strength of the signal having the second frequency $f_2$, and the controller 113 may not change a reception frequency.

The strength of the signal having the first frequency $f_1$ may become smaller than the strength of the signal having the second frequency $f_2$ while the vehicle 1 is traveling in the area B, and the controller 113 may determine the frequency change with regard to the maximum gain of the signals having the respective frequencies. For example, as shown in FIG. 12F, the corrected reception strength of the signal having the first frequency $f_1$ may be smaller than the corrected reception strength of the signal having the second frequency $f_2$, and the controller 113 may change the reception frequency from the first frequency $f_1$ to the second frequency $f_2$.

As a result, the vehicle 1 may receive the signal having the first frequency $f_1$, which is strong in the strength of the signal in the area A, and receive the signal having the second frequency $f_2$, which is strong in the strength of the signal in the area B.

The controller 113 may use a mathematical expression that reflects antenna characteristics or a lookup table that reflects the antenna characteristics in order to correct the strengths of the signals having the respective frequencies into a strength of the maximum gain.

For example, the controller 113 may correct the strengths of the signals having the respective frequencies to the strength of the maximum gain by using a function similar to a gain curve of an antenna according to a position of the switch.

As shown in FIG. 13, the controller 113 may store a first function F1 indicating a gain curve of the antenna when the switch is located at the point SW1, a second function F2 indicating a gain curve of the antenna when the switch is located at the point SW2, a third function F3 indicating a gain curve of the antenna when the switch is located at the point SW3, and a fourth function F4 indicating a gain curve of the antenna when the switch is located at the point SW4.

The first function F1 may represent a gain of the antenna for a signal having a frequency of 88 MHz or higher and lower than 93 MHz, the second function F2 may represent a gain of the antenna for a signal having a frequency of 93 MHz or higher and lower than 98 MHz, the third function F3 may represent a gain of the antenna for a signal having a frequency of 98 MHz or higher and lower than 103 MHz, and the fourth function F4 may represent a gain of the antenna for a signal having a frequency of 103 MHz or higher and lower than 108 MHz.

For example, when the switch is currently located at the point SW2, and the signal having the first frequency $f_1$ of 93 MHz or higher and lower than 98 MHz is received, the controller 113 may correct the reception strength of the signal having the second frequency $f_2$ of 98 MHz or higher and lower than 103 MHz by using the second function F2 and the third function F3.

In detail, the controller 113 may correct the reception strength of the signal having the second frequency $f_2$ based on a difference between an output of the second function F2 when the second frequency $f_2$ is input and an output of the third function F3 when the second frequency $f_2$ is input. The controller 113 may compare the reception strength of the signal having the first frequency $f_1$ with the corrected reception strength of the signal having the second frequency $f_2$, and determine the frequency change based on the comparison result.

In addition, the controller 113 may correct the strength of the signal having the first frequency $f_1$ into the strength of the maximum gain based on an output of the second function F2 when the first frequency $f_1$ is input, and correct the strength of the signal having the second frequency $f_2$ into the strength of the maximum gain based on the output of the third function F3 when the second frequency $f_2$ is input. The controller 113 may compare a maximum strength of the signal having the first frequency $f_1$ with a maximum strength of the signal having the second frequency $f_2$, and determine the frequency change based on a comparison result.

As shown in FIG. 14, the controller 113 may store a first table including gain curve values of the antenna when the switch is located at the point SW1, a second table including gain curve values of the antenna when the switch is located at the point SW2, a third table including gain curve values of the antenna when the switch is located at the point SW3, and a fourth table including gain curve values of the antenna when the switch is located at the point SW4.

The first table may include gain values of the antenna for signals having a frequency of 88 MHz or higher and lower than 93 MHz, the second table may include gain values of the antenna for signals having a frequency of 93 MHz or higher and lower than 98 MHz, the third table may include gain values of the antenna for signals having a frequency of 98 MHz or higher and lower than 103 MHz, and the fourth table may include gain values of the antenna for signals having a frequency of 103 MHz or higher and lower than 108 MHz.

For example, when the switch is currently located at the point SW2, and the signal having the first frequency $f_1$ of 93 MHz or higher and lower than 98 MHz is received, the controller 113 may correct the reception strength of the signal having the second frequency $f_2$ of 98 MHz or higher and lower than 103 MHz by using the second table and the third table.

In detail, the controller 113 may correct the strength of the signal having the first frequency $f_1$ into the strength of the maximum gain based on an output of the second table corresponding to the first frequency $f_1$, and correct the strength of the signal having the second frequency $f_2$ into the strength of the maximum gain based on an output of the third table corresponding to the second frequency $f_2$. The controller 113 may compare the maximum strength of the signal having the first frequency $f_1$ with the maximum strength of the signal having the second frequency $f_2$, and determine the frequency change based on the comparison result.

In addition, the controller 113 may correct the reception strength of the signal having the second frequency $f_2$ based on a difference between an output of the second table corresponding to the second frequency $f_2$ and the output of the third table corresponding to the second frequency $f_2$. The controller 113 may compare the reception strength of the signal having the first frequency $f_1$ with the corrected reception strength of the signal having the second frequency $f_2$, and determine the frequency change based on the comparison result.

FIG. 15 is a view illustrating the operation of the antenna apparatus in another form of the present disclosure.

The vehicle 1 receives a broadcast signal (1010).

The vehicle 1 may receive signals including broadcast content through the antenna apparatus 100.

For example, the vehicle 1 may receive the signal having the first frequency $f_1$ and the signal having the second frequency $f_2$, and output the broadcast content from the signal having the first frequency $f_1$.

The vehicle 1 corrects a reception strength of the broadcast signal having different frequencies (1020).

The vehicle 1 may correct the reception strength of the frequencies of the broadcast signal by using the functions F1, F2, F3, and F4 indicating the gain curves of the antenna apparatus 100, or the lookup tables T1, T2, T3, and T4.

For example, the vehicle 1 may correct the signal having the first frequency $f_1$ and the signal having the second frequency $f_2$ by using the functions F1, F2, F3, and F4, or the lookup tables T1, T2, T3, and T4.

The vehicle 1 may correct the reception strength of the signal having the second frequency $f_2$ based on the difference between the output of the second function F2 when the second frequency $f_2$ is input and the output of the third function F3 when the second frequency $f_2$ is input. In addition, the vehicle 1 may correct the strength of the signal having the first frequency $f_1$ into the strength of the maximum gain based on the output of the second function F2 when the first frequency $f_1$ is input, and correct the strength of the signal having the second frequency $f_2$ into the strength of the maximum gain based on the output of the third function F3 when the second frequency $f_2$ is input.

The vehicle 1 may correct the strength of the signal having the first frequency $f_1$ into the strength of the maximum gain based on the output of the second table corresponding to the first frequency $f_1$, and correct the strength of the signal having the second frequency $f_2$ into the strength of the maximum gain based on the output of the third table corresponding to the second frequency $f_2$. In addition, the vehicle 1 may compare the maximum strength of the signal having the first frequency $f_1$ with the maximum strength of the signal having the second frequency $f_2$, and determine the frequency change based on the comparison result.

The vehicle 1 determines a reception frequency based on a result of comparison performed on corrected reception strengths of the broadcast signal having the different frequencies (1030).

The vehicle 1 may compare the corrected reception strengths of the frequencies of the broadcast signal with each other, and determine the reception frequency for receiving the broadcast content based on the comparison result.

For example, the vehicle 1 may compare the corrected reception strength of the signal having the first frequency $f_1$ with the corrected reception strength of the signal having the second frequency $f_2$, and extract the broadcast content from a signal having a stronger corrected strength between the signal having the first frequency $f_1$ and the signal having the second frequency $f_2$ based on the comparison result.

In detail, the broadcast content may be carried in the area A through the first frequency $f_1$, and identical broadcast content may be carried in the area B through the second frequency $f_2$. The vehicle 1 may place the switch at the point SW2 in the area A to receive the signal having the first frequency $f_1$, and may place the switch at the point SW3 in the area B to receive the signal having the second frequency $f_2$.

The vehicle 1 may correct reception strengths of a plurality of signals having different frequencies for carrying identical content. In addition, the vehicle 1 may obtain the content from a signal having a maximum reception strength based on corrected reception strengths of the signals.

As described above, the vehicle 1 may automatically change the reception frequency of the signal and change frequency characteristics of the antenna apparatus 100 as an area in which the vehicle 1 is traveling is changed.

At least one component may be added or deleted corresponding to performance of the components of the antenna apparatus 100. In addition, it will be readily understood by those skilled in the art that a mutual position of the components can be changed corresponding to performance or a structure of a system.

Meanwhile, some components of the antenna apparatus 100 may be software components and/or hardware components such as a field programmable gate array (FPGA) and an application specific integrated circuit (ASIC).

As is apparent from the above description, in accordance with an aspect of the present disclosure, a vehicle, a control method thereof, and an antenna apparatus for a vehicle, which have high signal-to-noise ratio characteristics regardless of a frequency band, can be provided.

In accordance with another aspect of the present disclosure, a vehicle, a control method thereof, and an antenna apparatus for a vehicle, which are capable of implementing optimum impedance matching for an antenna according to a frequency, can be provided.

In accordance with still another aspect of the present disclosure, a vehicle, a control method thereof, and an antenna apparatus for a vehicle, which are capable of automatically changing a frequency according to an area, can be provided.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle comprising:
an antenna having different gain characteristics in different operating frequency bands; and
a controller configured to:
correct reception strengths of a plurality of signals having different frequencies for carrying identical content;
change the gain characteristic of the antenna based on the reception strengths of the plurality of signals; and
obtain content from a signal of the plurality of signals having a maximum reception strength,
wherein the antenna further comprises:
a coil configured to receive a wireless signal; and
a switch configured to adjust an operating frequency band of the coil, and wherein the controller is configured to change the operating frequency band of the coil by controlling the switch based on the corrected reception strengths of the plurality of signals,
wherein the switch is connectable to the coil at a plurality of connection points, and the operating frequency band of the coil is adjusted when a connection point of the switch is changed based on the corrected reception strengths of the plurality of signals,
wherein the controller is configured to correct the reception strengths of the plurality of signals based on a plurality of characteristic functions indicating different gain characteristics, and
wherein the controller is configured to perform:
a first characteristic function of a first operating frequency band; and
a second characteristic function of a second operating frequency band, wherein the controller is configured to obtain the content from a signal of the plurality of signals having a first frequency based on whether an output value of the first characteristic function for the first frequency is greater than an output value of the second characteristic function for a second frequency.

2. The vehicle of claim 1, wherein the controller is configured to correct the reception strengths of the plurality of signals based on a plurality of characteristic tables indicating the different gain characteristics.

3. The vehicle of claim 2, wherein the controller comprises:
a first characteristic table of the first operating frequency band; and
a second characteristic table of the second operating frequency band, wherein the controller is configured to obtain the content from a signal of the plurality of signals having the first frequency based on whether an output value of the first characteristic table for the first frequency is greater than an output value of the second characteristic table for the second frequency.

4. The vehicle of claim 1, wherein the controller is configured to determine the operating frequency band of the coil based on a frequency selected by a user.

5. The vehicle of claim 1, wherein the vehicle further comprises:
an amplifier configured to amplify a wireless signal received from the antenna,
wherein the controller is configured to control an impedance fluctuation range of the amplifier based on the corrected reception strengths of the plurality of signals.

6. The vehicle of claim 5, wherein:
the amplifier further comprises a switch, a plurality of inductors, and an amplifying circuit, and
the controller is configured to connect the switch to an inductor of the plurality of inductors based on the corrected reception strengths of the plurality of signals.

7. A method of controlling a vehicle including an antenna having different gain characteristics in different operating frequency bands, the method comprising:
correcting reception strengths of a plurality of signals having different frequencies for carrying identical content;
changing the gain characteristic of the antenna based on the reception strengths of the plurality of signals; and
obtaining content from a signal of the plurality of signals having a maximum reception strength,
wherein the antenna further comprises:
a coil configured to receive a wireless signal; and
a switch configured to adjust an operating frequency band of the coil,
wherein the switch is connectable to the coil at a plurality of connection points, and
the operating frequency band of the coil is adjusted when a connection point of the switch is changed based on the corrected reception strengths of the plurality of signals,
wherein the changing of the gain characteristic of the antenna includes changing the operating frequency band of the coil by controlling the switch based on the corrected reception strengths of the plurality of signals,
wherein correcting the reception strengths of the plurality of signals comprises:
correcting the reception strengths of the plurality of signals based on a plurality of characteristic functions indicating different gain characteristics, and
wherein obtaining the content from the signal of the plurality of signals having the maximum reception strength comprises:
obtaining the content from a signal of the plurality of signals having a first frequency based on whether an output value of a first characteristic function for the first frequency is greater than an output value of a second characteristic function for a second frequency.

8. The method of claim 7, wherein correcting the reception strengths of the plurality of signals comprises:
correcting the reception strengths of the plurality of signals based on a plurality of characteristic tables indicating the different gain characteristics.

9. The method of claim 8, wherein obtaining the content from the signal of the plurality of signals having the maximum reception strength comprises:
obtaining the content from a signal of the plurality of signals having the first frequency based on whether an output value of a first characteristic table for the first frequency is greater than an output value of a second characteristic table for a second frequency.

10. An antenna apparatus comprising:
a coil configured to receive a wireless signal;
a switch configured to adjust an operating frequency band of the coil; and
a controller configured to:
correct reception strengths of a plurality of signals having different frequencies for carrying identical content;
change the operating frequency band of the coil by controlling the switch based on the corrected reception strengths of the plurality of signals; and
obtain content from a signal of the plurality of signals having a maximum reception strength,
wherein the switch is connectable to the coil at a plurality of connection points, and the operating frequency band of the coil is adjusted when a connection point of the switch is changed based on the corrected reception strengths of the plurality of signals,
wherein the controller is configured to correct the reception strengths of the plurality of signals based on a plurality of characteristic functions indicating different gain characteristics, and
wherein the controller is configured to perform:
a first characteristic function of a first operating frequency band; and
a second characteristic function of a second operating frequency band, wherein the controller is configured to obtain the content from a signal of the plurality of signals having a first frequency based on whether an output value of the first characteristic function for the first frequency is greater than an output value of the second characteristic function for a second frequency.

11. The antenna apparatus of claim 10, wherein the controller is configured to correct the reception strengths of the plurality of signals based on a plurality of characteristic tables indicating the gain characteristics of the operating frequency band.

12. The antenna apparatus of claim 11, wherein the controller comprises:
a first characteristic table of the first operating frequency band; and
a second characteristic table of the second operating frequency band, wherein the controller is configured to obtain the content from a signal of the plurality of signals having the first frequency based on whether an output value of the first characteristic table for the first frequency is greater than an output value of the second characteristic table for the second frequency.

* * * * *